United States Patent [19]
Shimpo et al.

[11] Patent Number: 6,012,543
[45] Date of Patent: Jan. 11, 2000

[54] SOUND ISOLATION PLATE STRUCTURE

[75] Inventors: Yuji Shimpo; Keijiro Iwao, both of Kanagawa-ken, Japan

[73] Assignee: Nissan Motor Co., Ltd., Kanagawa-ken, Japan

[21] Appl. No.: 09/038,503

[22] Filed: Mar. 9, 1998

[30] Foreign Application Priority Data

Mar. 7, 1997 [JP] Japan ................................. 9-053489

[51] Int. Cl.[7] ............................................. E04B 1/82
[52] U.S. Cl. ......................................... 181/286; 181/290
[58] Field of Search .................................. 181/208, 284, 181/286, 288, 290, 292, 293, 294, 295

[56] References Cited

U.S. PATENT DOCUMENTS

| | | | |
|---|---|---|---|
| 3,819,007 | 6/1974 | Wirt et al. ............................... | 181/286 |
| 4,035,535 | 7/1977 | Taylor ..................................... | 181/286 |
| 5,854,453 | 12/1998 | Fujiwara et al. ........................ | 181/295 |

*Primary Examiner*—Khanh Dang
*Attorney, Agent, or Firm*—McDermott, Will & Emery

[57] ABSTRACT

An airflow type sound isolation plate structure comprises two sheets of plate members positioned in parallel at a predetermined interval. One of plate members is arranged on an air inlet side and the other of plate members is arranged on an air outlet side. Plural sets of first opposing holes and plural sets of opposing second holes are provided in two sheets of plate members respectively. Peripheral areas of respective sets of first holes are connected by cylindrical connecting portions so as to form a continuous hole in their internal spaces. Annularly extended portions are provided to peripheral areas of respective sets of second holes so as to oppose to each other and not to contact to each other. Internal spaces are provided around the annularly extended portions between both plate members. Inner peripheral surfaces of the first holes and the second holes formed in one of plate members are expanded gradually toward the upstream side of air flow. As a result, air flow passes through peripheral portions of the holes without separation from the inner peripheral surfaces and therefore the an air permeability is improved much more. In addition, all areas of top inner peripheral surfaces of the annularly extended portions formed in one of plate members are positioned on the inside rather than those of top inner peripheral surfaces of the annularly extended portions formed in the other of plate members. Vortex flows are turned toward the center sides by edge portions of the annularly extended portions following to the holes. As a result, whistling sound is prevented from being generated at portions connected to air chambers.

19 Claims, 10 Drawing Sheets

SOUND ISOLATION PLATE STRUCTURE

The contents of Application No. TOKUGANHEI 9-53489, filed on Mar. 7, 1997 in Japan (pre-publication (Kokai) No. 10-254456 published on Sep. 25, 1998), on which the content and claim for priority of the instant application are based, are hereby incorporated by reference.

BACKGROUND OF THE INVENTION

The present invention relates to a airflow type sound isolation plate, for example, an under cover provided on the bottom of the engine room of the car, an inlet cover provided to the air inlet of the air conditioner, etc., which needs compatibility between an air permeability and a sound isolation performance.

Figure 1:
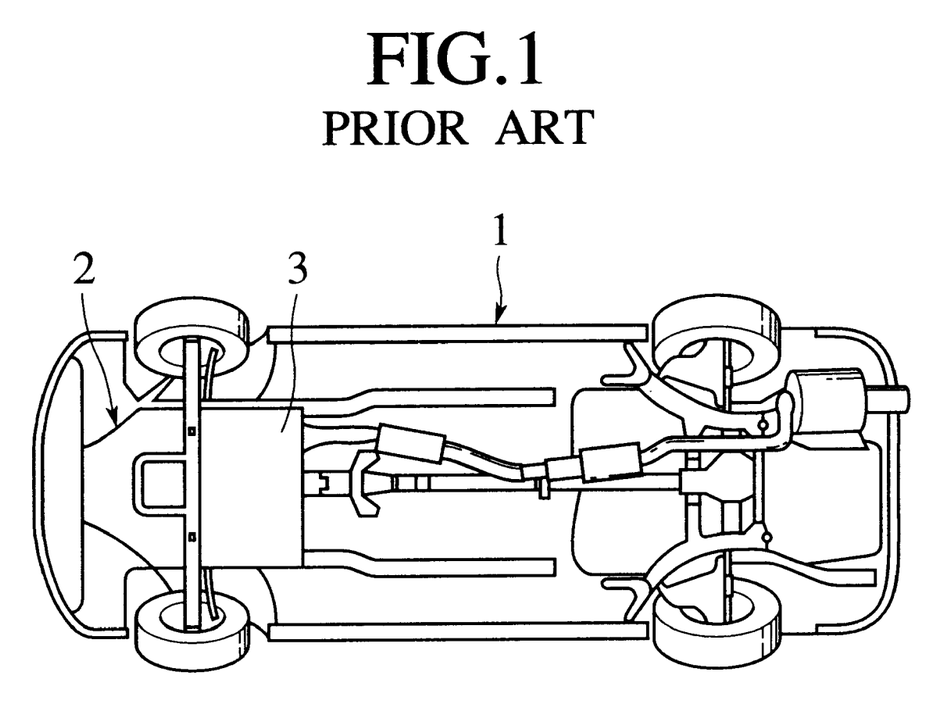
FIG. 1 is a bottom view showing a car having an under cover in the prior art.

As shown in FIG. 1, the under cover 3 is fitted on the bottom of the engine room 2 of the common car 1. This under cover 3 prevents an oil pan of the engine, etc. from directly striking against protruded things on the road. Also, the under cover 3 functions as a sound isolation wall to suppress an engine noise which is radiated from the engine room 2 to the outside of the car.

A fitting area of the under cover 3 wider, a sound isolation effect achieved by the under cover 3 higher. However, if the fitting area of the under cover 3 is increased, a sealing degree of the engine room 2 is enhanced by such under cover 3 and thus the air permeability of the engine room 2 is lowered. It is likely that an increase in an atmospheric temperature of the engine room 2 is caused. Therefore, in practice the air permeability must be assured on a preferential basis. As a result, a limitation is imposed on an improvement in the sound isolation effect by virtue of an increase of the fitting area of the under cover 3.

SUMMARY OF THE INVENTION

The present invention has been made in view of the above problems and it is an object of the present invention to provide a sound isolation plate structure which is capable of improving both an air permeability and a sound isolation property.

It is another object of the present invention to provide a sound isolation plate structure which is capable of improving the air permeability much more, and preventing generation of whistling sound generated by the air flow, and enhancing quality sense and reliability much more.

According to an aspect of the present invention, there is provided an airflow type sound isolation plate structure comprising:

a first plate member and second plate member, the plate members positioned in parallel at a predetermined interval, the first plate member being arranged on an air inlet side, the second plate member being arranged on an air outlet side;

plural sets of first holes provided in the plate members respectively so as to oppose to each other;

plural sets of second holes provided adjacent to the plural sets of first holes in two sheets of plate members respectively so as to oppose to each other;

cylindrical connecting portions connecting peripheral areas of respective sets of the first holes such that continuous holes are form therein;

annularly extended portions extended from peripheral areas of the plural sets of second holes respectively so as to oppose to each other and not to contact to each other; and internal spaces provided around annularly extended portions between both the plate members respectively; wherein inner peripheral surfaces of the first holes and the second holes formed in the first plate member are expanded gradually toward an upstream side of air flow, and all areas of top inner peripheral surfaces of the annularly extended portions formed in the first plate member are positioned on an inside rather than all areas of top inner peripheral surfaces of the annularly extended portions formed in the second plate member.

Inner peripheral surfaces of the first holes and the second holes formed in the second plate member may be expanded gradually toward the downstream side of the air flow.

With the above configuration, the air included in the continuous hole act as the pneumatic mass. Hence, single-degree-of-freedom vibration systems are formed in the continuous holes respectively. In addition, the air layer included between the annularly extended portions acts as the pneumatic mass and also the air layer in the air chamber acts as an air spring. Thereby, two-degrees-of-freedom vibration systems are formed between the second holes. The single-degree-of-freedom vibration system has no resonance frequency, and therefore the transmitted wave is equal to the incident wave in phase. In contrast, the two-degrees-of-freedom vibration system has only one resonance frequency and therefore, for frequencies in excess of the resonance frequency, the transmitted wave is opposite to the incident wave in phase. For this reason, in the frequency bandwidth in excess of the resonance frequency of the two-degrees-of-freedom vibration system, the transmitted waves transmitted via the continuous holes are opposite to the transmitted waves transmitted via the holes respectively so as to be canceled by virtue of interference. As a consequence, the sound isolation effect is achieved. The air permeability is assured by the first holes and the second holes. Therefore, if this sound isolation plate is applied to the under cover of the engine room, compatibility between both an improvement in cooling capability of the engine room and noise suppression are attained.

Besides, since the inner peripheral surfaces of the first holes and the second holes on the inlet side of the air flow are expanded gradually toward the upstream side of the air flow, the air flows along the peripheral portions of the first holes or the peripheral portions of the second holes and flow into smoothly between the annularly extended portions or the continuous holes. Therefore, the air flows never separate from the inner surfaces of the first holes and the annular extended portions and the inner surfaces of the second holes and the continuous holes, so that the air flows through with using full internal sectional areas of both the continuous holes and the annular extended portions effectively. As a result, airflow resistance is remarkably reduced and air permeability of the sound isolation plate is further improved.

In addition, because of the air flow passing from the one annularly extended portions to the other annularly extended portions, vortex flows are generated in the inside of the second holes. If the generated vortex flows are forced to collide with the other annularly extended portions periodically, periodical air particle vibrations are caused between top ends of both the annularly extended portions. Thus, the internal spaces on the outside of the annularly extended portions are caused to be resonant with each other, so that it is likely to generate so-called whistling sounds.

On the contrary, according to the first aspect of the present invention, since all areas of the top inner peripheral surfaces of the annularly extended portions formed in the one plate members are positioned on the inside rather than those of the top inner peripheral surfaces of the annularly extended portions formed in the other plate members, the air flows coming up to the other annularly extended portions are deviated to the center sides of the other annularly extended portions. For this reason, the vortex flows are generated to be deviated to the center sides of both the annularly extended portions respectively, so that they never collide with the end portions of the other annularly extended portions. Therefore, periodical air particle vibrations are not generated between top ends of both the annularly extended portions and therefore generation of the whistling sound due to such periodical air particle vibrations is firmly prevented.

Further, projections which protrude to the inside rather than all areas of top inner peripheral surfaces of the annularly extended portions formed in the second plate member may be provided to top ends of the annularly extended portions formed in the first plate member.

With the above configuration, even if the second holes in both plate members are formed to have the same inner diameter, all areas of top inner peripheral surfaces of the one annularly extended portions are positioned on the inside rather than those of top inner peripheral surfaces of the other annularly extended portions by use of simple structures, i.e., projections, so that generation of the whistling sound is firmly prevented. Tuning of the projection height is also easily done.

Inner diameters of the annularly extended portions formed in the first plate member may be set smaller than top end inner diameters of the annularly extended portions formed in the second plate member.

With the above configuration, without particular modification of inner surfaces of the extended portions, all areas of top inner peripheral surfaces of the one annularly extended portions are positioned on the inside rather than those of top inner peripheral surfaces of the other annularly extended portions. Hence, inner surfaces of the extended portions are formed freely such that the airflow resistance against the air flows which flow in along the peripheries of the second holes is made minimum. Thus, the air permeability is further improved and also the annularly extended portions is effective for the air flow at high speed.

In addition, the projections may be made low gradually toward the first plate member.

With the above configuration, the projections do not serve as the airflow resistance against the air flows which flow in along the peripheries of the second holes. Therefore, the air permeability is further improved and also the annularly extended portions is effective for the air flow at high speed.

In addition, a ratio H/L may be set to more than 0.1. In this case H is an offset length of top end inner peripheral surfaces of the annularly extended portions formed in the first plate member with respect to top end inner peripheral surfaces of the annularly extended portions formed in the second plate member, and L is an interval between the annularly extended portions formed in both the first plate member and the second plate member.

With the above configuration, since a ratio of the offset length H to the interval L between the annularly extended portions is set properly, the air permeability is not damaged in the least and the whistling sound is firmly prevented.

In addition, inner peripheral surfaces of the first holes and the second holes formed in the one plate member and the other plate member may be formed by the curved surfaces with an appropriate radius of curvature R such that they are expanded gradually toward the upstream side or the downstream side of the air flow respectively. A ratio R/D of the radius of curvature R to the inner diameter D of opposing holes may be set to more than 0.08.

With the above configuration, since the ratio R/D of the radius of curvature R to the inner diameter D of opposing holes may be set properly, the airflow resistance is made minimum and also the air permeability is improved much more.

In addition, a ratio T/D of the total thickness T of the sound isolation plate to the inner diameter D of the second holes may be set to more than 1.

With the above configuration, since the ratio T/D of the total thickness T of the sound isolation plate to the inner diameter D of the second holes are set properly, the airflow resistance is made minimum and also the air permeability is improved still more.

According to another aspect of the present invention, there is provided an airflow type sound isolation plate structure comprising:

a first plate member and second plate member, the plate members positioned in parallel at a predetermined interval, the first plate member being arranged on an air inlet side, the second plate member being arranged on an air outlet side;

plural sets of holes provided in the plate members respectively so as to oppose to each other;

cylindrical connecting portions for connecting peripheral areas of respective sets of holes such that continuous holes are formed therein; and through holes formed in the cylindrical connecting portions so as to connect inner spaces and outer spaces of the continuous holes respectively; wherein inner peripheral surfaces of the holes formed in the first plate member are expanded gradually toward an upstream side of air flow, and peripheral portions of the through holes which are formed in the continuous holes and located on a first plate member side are positioned to protrude to an inside rather than those of the through holes which are formed in the continuous holes and located on a second plate member side.

The cylindrical connecting portions may include a plurality of through holes each positioned at a substantially equal distance from the first plate member or the second plate member.

Projections which protrude to an inside rather than inner surfaces of the cylindrical connecting portions may be provided to peripheral portions of the through holes formed in the continuous holes on the first plate member side.

Inner peripheral surfaces of the holes formed in the second plate member may be expanded gradually toward a downstream of air flow.

With the above configuration, the cylindrical air layer acts as a pneumatic mass in the central areas of the continuous holes. Therefore, single-degree-of-freedom vibration systems are formed in these central areas respectively. In addition, at the peripheral portions of the continuous holes, doughnut-like air layers around respective peripheral portions of the holes acts as pneumatic masses and also annular air layers between the pneumatic masses acts as air springs. Therefore, two-degrees-of-freedom vibration systems are formed in these peripheral portions. In this manner, the single-degree-of-freedom vibration systems and the two-degrees-of-freedom vibration systems are composed in the continuous holes respectively. The sound isolation effect is obtained due to transmitted wave interference generated by actions of these systems. The air permeability is assured by the holes. As a result, if the sound isolation plate is applied to the under cover of the engine room, compatibility between improvement in cooling capability and the noise suppression is accomplished. Furthermore, the frequency characteristic of transmission loss of the sound isolation plate is arbitrarily tuned by adjusting the number, size, shape, etc. of the through holes.

Since the inner peripheral surfaces of the holes on the inlet side of the air flow are expanded gradually toward the upstream side of the air flow, the air flows in passed along peripheral portions of the holes and flow smoothly into the continuous holes. Therefore, the air flows never separate from the inner peripheral surfaces of the continuous holes, so that the air flows through with using full internal sectional areas of the continuous holes 86a effectively. As a result, the airflow resistance is remarkably reduced and the air permeability of the sound isolation plate is further improved.

In addition, because of the air flows passing through the continuous holes respectively, vortex flows are generated at the downstream side peripheral portions of the through holes in the continuous holes. If the generated vortex flows are forced to collide with the downstream side peripheral portions of the through holes periodically, periodical air particle vibrations are caused in the through holes. Thus, the internal spaces formed on the outside of the cylindrical connecting portions 86 are caused to be resonant with each other, so that there is a possibility that so-called whistling sounds are generated.

On the contrary, according to the second aspect of the present invention, since the one plate members are protruded to the inside rather than the other plate members, the air flows in the continuous holes are deviated to the center sides of the continuous holes in terms of the stepped portions respectively when they pass through in the neighboring of the through holes. For this reason, the vortex flows are generated to be deviated to the center sides of the continuous holes respectively, so that they never collide with the peripheral portions of the through holes on the downstream side. Therefore, periodical air particle vibrations are not generated in the through holes and therefore generation of the whistling sound due to such periodical air particle vibrations is surely prevented.

The ratio H/L may be set to more than 0.1. In this case, however, H is a projection height of each of the peripheral portions of the through holes on the first plate member side with respect to that of the peripheral portions of the through holes on the second plate member side, and L is a length of each of the through holes along the continuous holes.

With the above configuration, since this ratio of H/L is set to more than 0.1 where H is the projection height of each of the peripheral portions of the through holes on the first plate member side with respect to that of the peripheral portions of the through holes on the second plate member side, and L is the length of each of the through holes along the continuous holes, the air permeability is not damaged at the least and the whistling sound is prevented without fail.

In addition, the projections may be made low gradually toward the one plate member.

With the above configuration, the projections do not serve as the airflow resistance against the air flows which flow in along the peripheries of the second holes. Therefore, the air permeability is further improved and also the annularly extended portions is effective for the air flow at high speed.

Inner peripheral surfaces of the holes formed in the one plate member and the other plate member may be formed by curved surfaces with the appropriate radius of curvature R so as to expand gradually toward the upstream side or the downstream side of the air flow, and the ratio R/D of the radius of curvature R to inner diameters D of respective corresponding holes may be set to more than 0.08.

With the above configuration, since the ratio R/D of the radius of curvature R to inner diameters D of the second holes may be set, the airflow resistance is made small and the air permeability is improved much more.

A ratio T/D of a total thickness T of the sound isolation plate to inner diameters D of the holes may be set to more than 1.

With the above configuration, since the ratio T/D of the total thickness T of the sound isolation plate to the inner diameters D of the holes is set properly, the airflow resistance is made small and the air permeability is further improved.

DESCRIPTION OF THE PREFERRED EMBODIMENTS

Embodiments of the present invention will be explained in detail with reference to the accompanying drawings hereinafter.

First Embodiment

Figure 2:
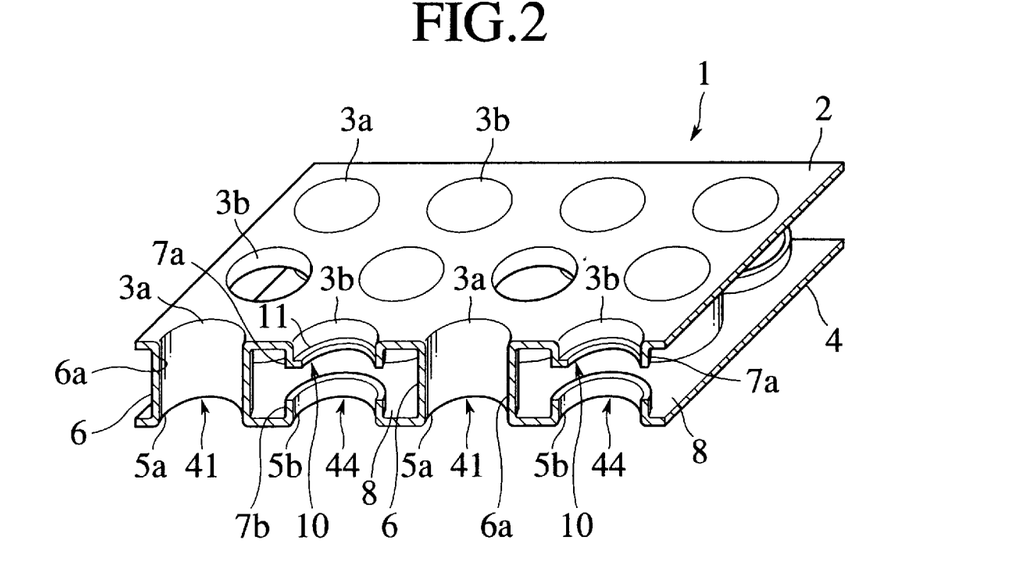
FIG. 2 is a perspective view showing a sound isolation plate structure according to a first embodiment of the present invention.

As shown in FIG. 2, a sound isolation plate 1 comprises two sheets of perforated boards (plate members) 2, 4 which are made of resin. One perforated board 2 is arranged on the inlet side of air flow (noise source side) and the other perforated board 4 is arranged on the outlet side of air flow. Two sheets of perforated boards 2, 4 are positioned in substantially parallel at a predetermined interval. Plural sets of first opposing holes 3a, 5a and plural sets of second opposing holes 3b, 5b are formed in the perforated boards 2, 4 respectively. The first holes 3a, 5a and the second holes 3b, 5b are arranged to be positioned alternatively in a lattice fashion respectively. The holes 3a, 3b, 5a, 5b are formed as circular through holes respectively.

Peripheral portions of the first opposing holes 3a, 5a are connected by cylindrical connecting portions 6 which are formed like cylinders. Inner surfaces of the first holes 3a, 5a and inner surfaces of the cylindrical connecting portions 6 are connected to form substantially coplanar circular surfaces respectively. Continuous holes 6a which continue to the first holes 3a, 5a are partitioned with the inner surfaces of the cylindrical connecting portions 6.

Annularly extended portions 7a, 7b which extend toward the inside of the sound isolation plate 1 so as not to contact to each other are provided to peripheral portions of the second opposing holes 3b, 5b respectively.

Internal spaces 8 are formed around the annularly extended portions 7a, 7b between both perforated boards 2, 4 respectively.

Figure 3:
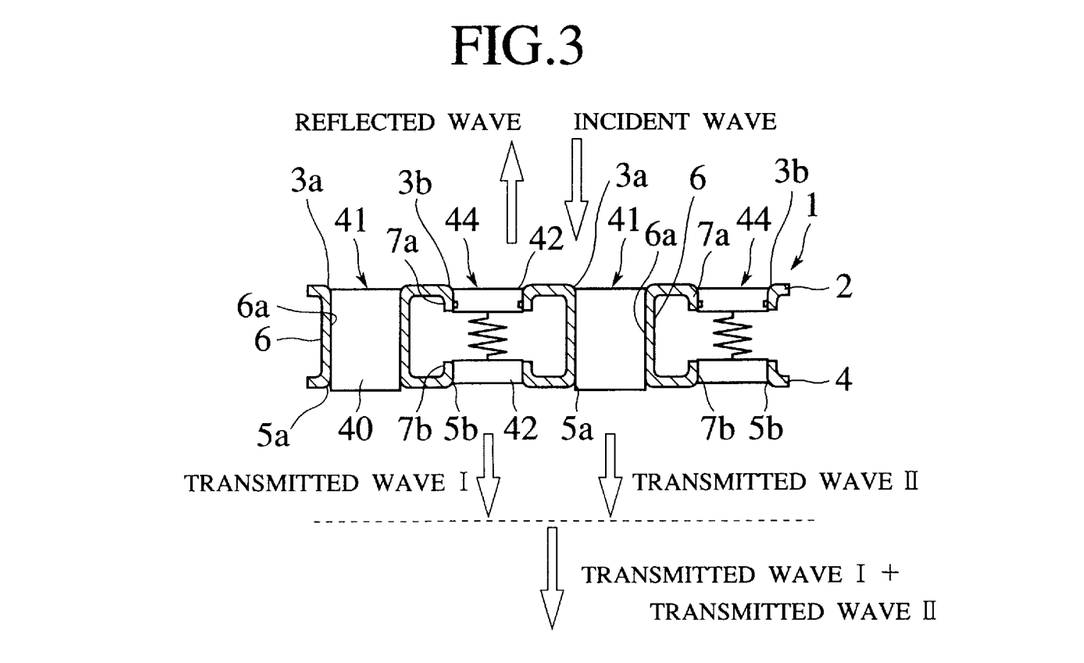
FIG. 3 is a sectional view showing a sound isolation mechanism of the sound isolation plate structure shown in FIG. 2.

As shown in FIG. 3, an air included in the continuous hole 6a acts as a pneumatic mass 40 which is vibrated by means of a periodically changing sound pressure as an external force. Therefore, single-degree-of-freedom vibration systems 41 is formed in the continuous holes 6a respectively. In addition, an air layer included between the annularly extended portions 7a, 7b acts as a pneumatic mass 42 and also an air layer in the air chamber 8 acts as a pneumatic mass 43. Thereby, two-degrees-of-freedom vibration systems 44 are formed between the second holes 3b, 5b.

As shown in FIG. 2, inner peripheral surfaces of the first holes 3a and the second holes 3b of the perforated board 2 are formed such that they expand gradually toward the upstream side of air flow (outside of the sound isolation plate 1). Inner peripheral surfaces of the first holes 5a and the second holes 5b of the perforated board 4 are formed such that they expand gradually toward the downstream side of air flow (outside of the sound isolation plate 1). Where the "shape expanding gradually toward the outside of the sound isolation plate 1" signifies, for example, a shape like a funnel which has a curved surface with an arbitrary radius of curvature R, etc.

Further, annularly stepped portions 10 are provided to at least one of the annularly extended portions 7a, 7b. The annularly stepped portions 10 are used to shift all areas of top inner peripheral surfaces of the annularly extended portions 7a formed in the perforated board 2 to the inside rather than those of top inner peripheral surfaces of the annularly extended portions 7b formed in the perforated board 4. The annularly extended portions 7a formed in the perforated board 2 are positioned on the upstream side of air flow which passes through the annularly extended portions 7a, 7b whereas the annularly extended portions 7b formed in the perforated board 4 are positioned on the downstream side of the air flow.

The annularly stepped portions 10 shown in the first embodiment are formed integrally with top end inner peripheral surfaces of the annularly extended portions 7a positioned on the upstream side of the air flow. The annularly stepped portions 10 are formed as annular projections 11 respectively. Heights of the annular projections 11 can be set arbitrarily respectively if they have their heights to protrude toward the inside rather than all areas of top inner peripheral surfaces of the annularly extended portions 7b.

In turn, an operation of the sound isolation plate structure according to the first embodiment of the present invention will be explained hereunder.

As described above, the sound isolation plate 1 has two kinds of vibration systems, i.e., the single-degree-of-freedom vibration systems 41 and the two-degrees-of-freedom vibration systems 44. Since the single-degree-of-freedom vibration system 41 has no resonance frequency, the transmitted wave is equal to the incident wave in phase. In contrast, the two-degrees-of-freedom vibration system 44 has only one resonance frequency and therefore, for frequencies in excess of the resonance frequency, the transmitted wave is opposite to the incident wave in phase. For this reason, in the frequency bandwidth in excess of the resonance frequency of the two-degrees-of-freedom vibration system 44, the transmitted waves transmitted via the continuous holes 6a are opposite to the transmitted waves transmitted via the holes 3b, 5b respectively so as to be canceled by virtue of interference. As a consequence, a sound isolation effect is achieved.

Accordingly, both the air permeability and the sound isolation property are obtained by constituting the under cover of the engine room by means of such sound isolation plate 1. As a result, heat in the engine room is easily discharged and also the noise in the engine room is suppressed from radiating to the outside, so that compatibility between both an improvement in cooling capability of the engine room and noise suppression are attained.

Figure 4:
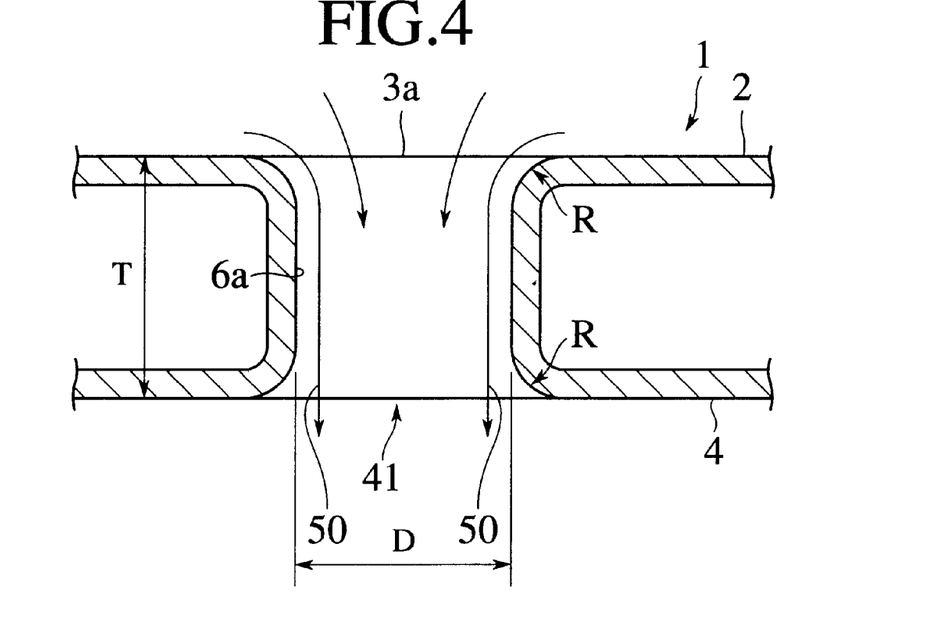
FIG. 4 is a sectional view showing a single-degree-of-freedom vibration system in the sound isolation plate structure shown in FIG. 2.
Figure 5:
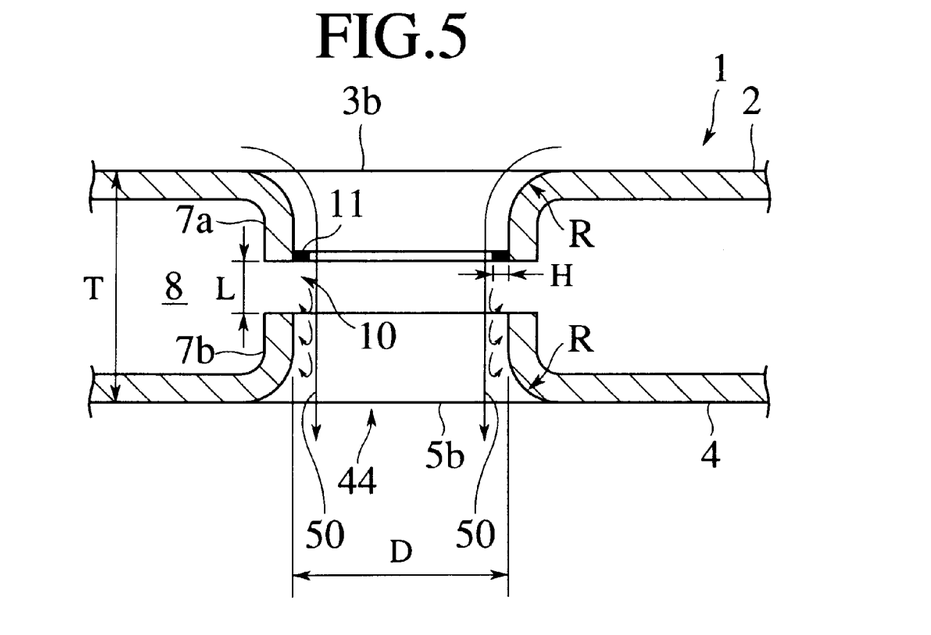
FIG. 5 is a sectional view showing a two-degrees-of-freedom vibration system in the sound isolation plate structure shown in FIG. 2.

As shown in FIGS. 4 and 5, the air, which are passed through peripheral portions of the holes 3a, 3b formed in the perforated board 2 positioned toward the inlet side, flows in along the funnel-shaped curved surfaces of the peripheral portions of the holes 3a, 3b, and are also passed through inner peripheral surfaces of the continuous holes 6a continuing to the funnel shapes and inner peripheral surfaces of the annular extended portions 7a, 7b, as indicated by an arrow 50.

Therefore, the air flows never separate from these inner peripheral surfaces of the continuous holes 6a and the annular extended portions 7a, 7b, so that the air flows through using full internal sectional areas of both the continuous holes 6a and the annular extended portions 7a, 7b effectively. As a result, airflow resistance is remarkably reduced and air permeability of the sound isolation plate 1 is further improved.

In addition, because of the air flow passing from the annularly extended portions 7a to the annularly extended portions 7b, vortex flows are generated in the inside of the second holes 3b, 5b.

Unless the annularly stepped portions are provided, the generated vortex flows are forced to collide with the annularly extended portions 7b periodically, so that periodical air particle vibrations are caused between top ends of the annularly extended portions 7a, 7b. Thus, the internal spaces 8 formed between the annularly extended portions 7a, 7b are caused to be resonant with each other, so that it is likely to generate so-called whistling sounds.

On the contrary, in the first embodiment, the air flows coming up to the annularly extended portions 7b are deviated to the center sides of the annularly extended portions 7b by virtue of the annularly stepped portions 10 respectively. For this reason, the vortex flows are generated to be deviated to the center sides of the annularly extended portions 7a, 7b respectively, so that they never collide with the end portions of the annularly extended portions 7b. Therefore, periodical air particle vibrations are not generated between top ends of the annularly extended portions 7a, 7b and therefore generation of the whistling sound due to such periodical air particle vibrations is firmly prevented.

As described later, a whistling sound preventing effect is effectively achieved by setting a height of the annularly stepped portions 10 (an offset of top end inner peripheral surfaces of the annular extended portions 7a relative to top end inner peripheral surfaces of the annular extended portions 7b) arbitrarily while taking the airflow resistance into consideration. In the first embodiment, since the annularly stepped portions 10 are formed by providing the annular projections 11 to the top end inner peripheral surfaces of the annular extended portions 7a, there are such advantages that the annularly stepped portions 10 is easily formed and also a height of the annular projections 11 is easily adjusted.

Second Embodiment

Figure 6:
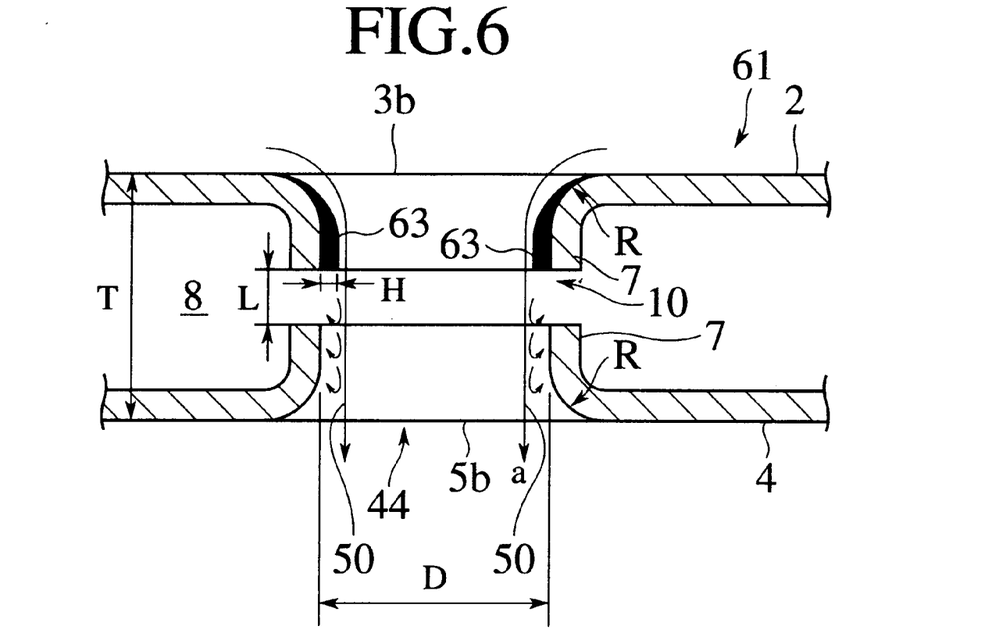
FIG. 6 is a sectional view showing a two-degrees-of-freedom vibration system in a sound isolation plate structure according to a second embodiment of the present invention.

FIG. 6 is a sectional view showing a pertinent portion of a sound isolation plate 61, i.e., a two-degrees-of-freedom vibration system in a sound isolation plate structure according to a second embodiment of the present invention.

In the second embodiment, projections 63, a height of which is made gradually low toward the perforated board 2, are provided in place of the annular projections 11 in the first embodiment. More particularly, the projections 63 are formed like a slope which gradually separate from a funnel-shaped curved surface formed on the peripheral portions of the second holes 3b. As a result, such sloped projections 63 in no way act as airflow resistance against the air flow passing through the funnel-shaped peripheral portions of the holes 3b. Therefore, the air permeability is further improved and thus the sloped projections 63 act effectively for the airflow passing through at high speed.

Third Embodiment

Figure 7:
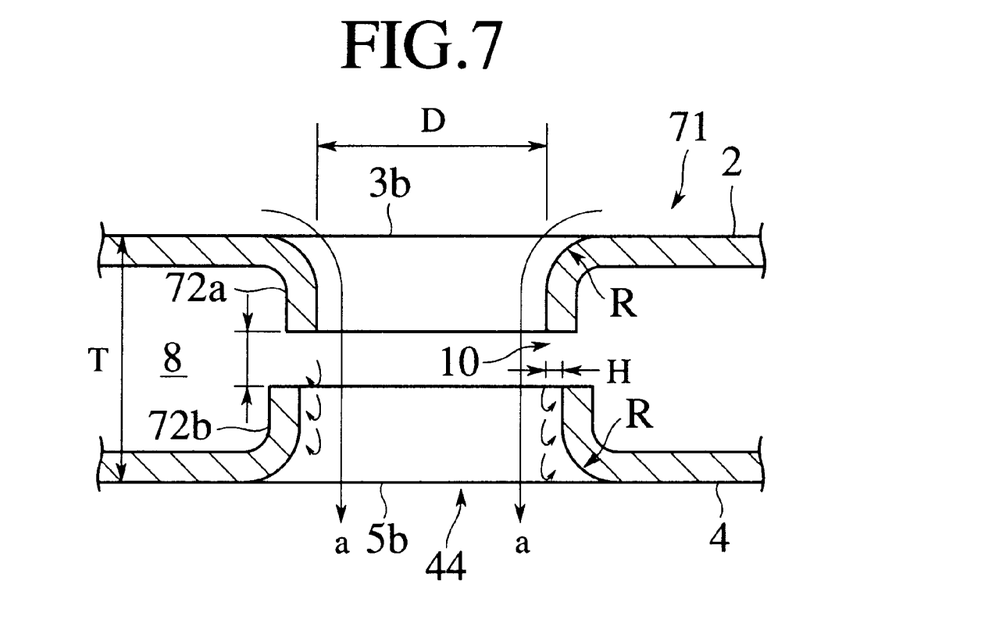
FIG. 7 is a sectional view showing a two-degrees-of-freedom vibration system in a sound isolation plate structure according to a third embodiment of the present invention.

FIG. 7 is a sectional view showing a pertinent portion of a sound isolation plate 71, i.e., a two-degrees-of-freedom vibration system in a sound isolation plate structure according to a third embodiment of the present invention.

In the third embodiment, without the annular projections 11 in the first embodiment and the sloped projections 63 in the second embodiment, the annularly stepped portions 10 are provided by forming inner diameters of the annularly extended portions 72a positioned on the upstream side smaller than top end inner diameters of the annularly extended portions 72b positioned on the downstream side.

Therefore, according to this structure in the third embodiment, generation of the whistling sound due to the same reasons as in the first and second embodiments is prevented by the annularly stepped portions 10.

In addition, since no projection acting as the airflow resistance is provided on the top end inner peripheral surfaces of the annularly extended portions 72a positioned on the upstream side of the air flow, the annularly stepped portions 10 never act as the airflow resistance against the air flow passing through the funnel-shaped peripheral portions of the holes 3b. As a result, the air permeability is improved much more and, in this case, the annularly stepped portions 10 also act effectively for the airflow passing through at high speed.

Fourth Embodiment

FIGS. 8 to 12 show a sound isolation plate structure according to a fourth embodiment of the present invention.

Figure 8:
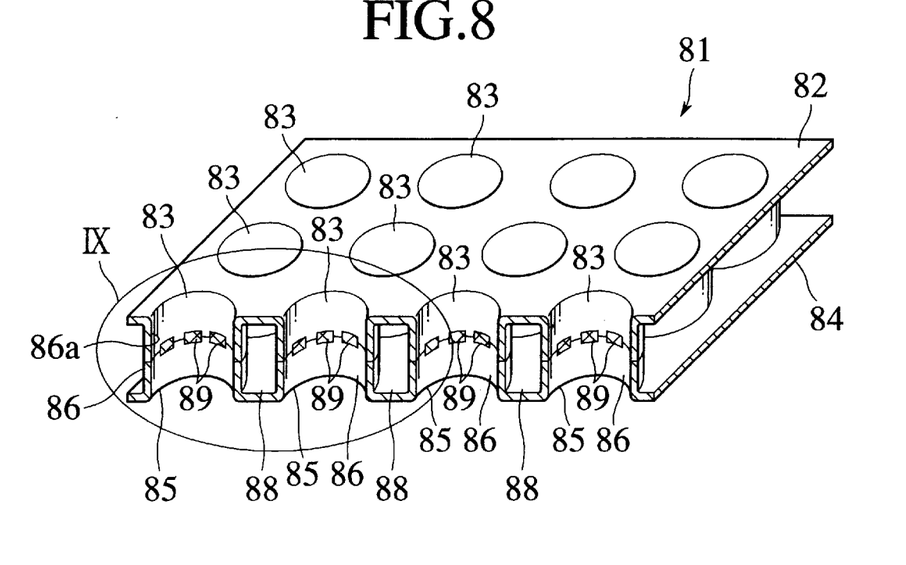
FIG. 8 is a perspective view showing a sound isolation plate structure according to a fourth embodiment of the present invention.
Figure 9:
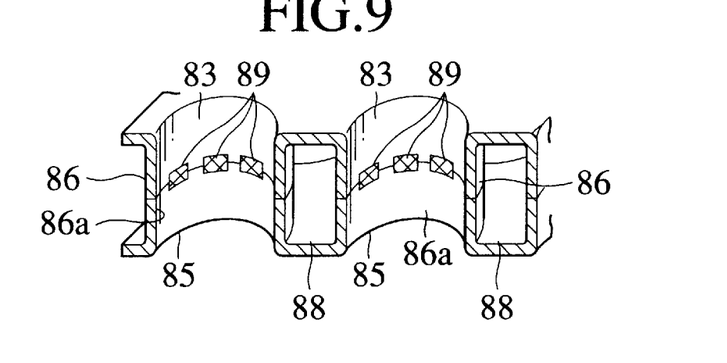
FIG. 9 is an enlarged perspective view showing a sectional shape of the IX portion of the sound isolation plate structure shown in FIG. 8.

As shown in FIG. 8, a sound isolation plate 81 comprises two sheets of perforated boards (plate members) 82, 84 made of resin. One perforated board 82 is arranged on the inlet side of air flow (noise source side) and the other perforated board 84 is arranged on the outlet side of air flow. Two sheets of perforated boards 82, 84 are positioned in substantially parallel at a predetermined interval.

Plural sets of opposing holes 83, 85 are formed in the perforated boards 82, 84 respectively. The holes 83, 85 are arranged in the perforated boards 82, 84 to be positioned alternatively in a lattice fashion respectively. The holes 83, 85 are formed as circular through holes respectively.

Peripheral portions of the opposing holes 83, 85 are connected by cylindrical connecting portions 86 which are formed like cylinders respectively. Inner surfaces of the holes 83, 85 and inner surfaces of the cylindrical connecting portions 86 are connected to form substantially coplanar circular surfaces respectively. Continuous holes 86a which continue to the holes 83, 85 are partitioned with the inner surfaces of the cylindrical connecting portions 86.

Figure 12:
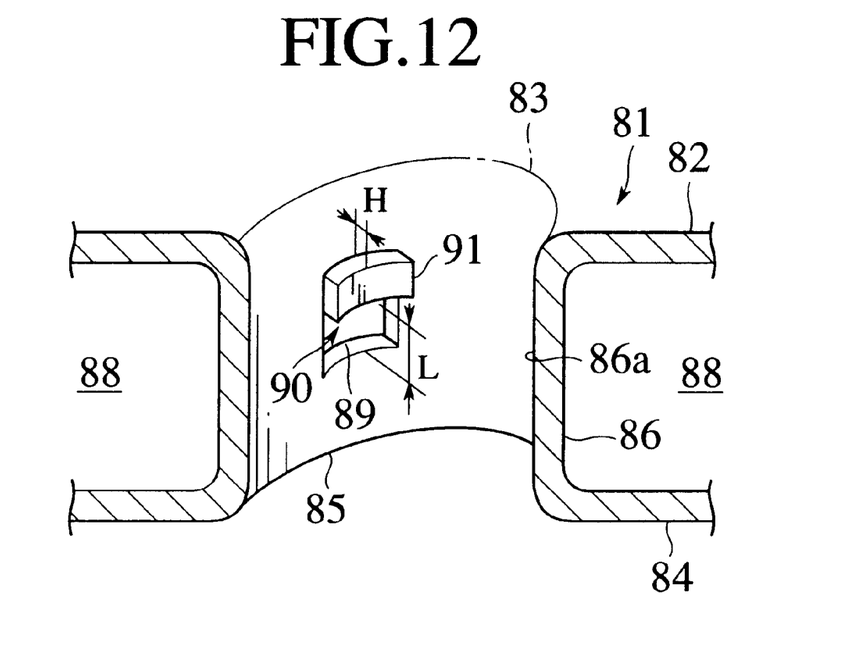
FIG. 12 is a perspective view showing a configuration around a through hole provided in the sound isolation plate structure shown in FIG. 8.

A plurality of through holes 89 which connect the inside and the outside of the continuous holes 86a respectively are provided in respective cylindrical connecting portions 86. The through holes 89 are arranged on the same periphery of circle which is placed in the substantially middle of both the perforated boards 82, 84 along their axial direction.

Stepped portions 90 are provided on the cylindrical connecting portions 86 respectively such that they protrude peripheral portions of the through holes 89 positioned on the upstream side (one perforated board 82 side) toward the inside rather than those positioned on the downstream side (the other perforated board 84 side) in the continuous holes 86a. In the fourth embodiment, the stepped portions 90 are formed on the upstream side portions out of the peripheral portions of the through holes 89 in the continuous holes 86a. The stepped portions 90 consist of projections 91 which protrude to the inside rather than the inner surfaces of the cylindrical connecting portions 86 respectively. A width of the projection 91 is set to be wider than that of the through hole 89. The projections 91 are formed such that their heights are made gradually low toward the perforated board 82 so as to reduce the airflow resistance.

Inner peripheral surfaces of the holes 83 of the perforated board 82 are formed such that they expand gradually toward the upstream side of air flow (outside of the sound isolation plate 81). Inner peripheral surfaces of the holes 85 of the perforated board 84 are formed such that they expand gradually toward the downstream side of air flow (outside of the sound isolation plate 81). Where the "shape expanding gradually toward the outside of the sound isolation plate 81" means, for example, a shape like a funnel which has a curved surface with an arbitrary radius of curvature R, etc.

Figure 10:
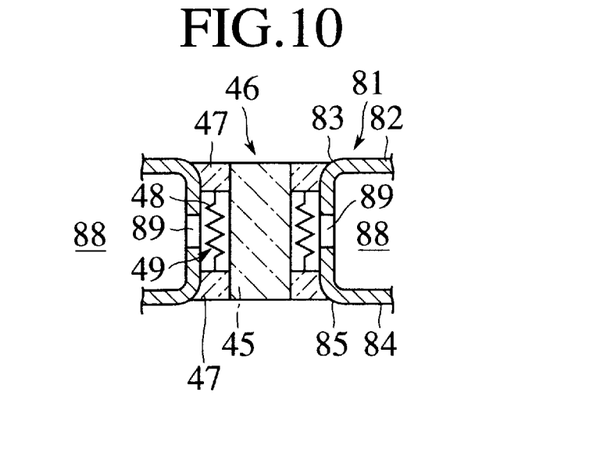
FIG. 10 is a sectional view showing a sound isolation mechanism of the sound isolation plate structure shown in FIG. 8.

As shown in FIG. 10, a cylindrical air layer acts as a pneumatic mass 45 in the central areas of the continuous holes 86a. Therefore, single-degree-of-freedom vibration systems 46 are formed in the central areas of the continuous holes 86a respectively. In addition, at the peripheral portions of the continuous holes 86a, doughnut-like air layers around respective peripheral portions of the holes 83, 85 act as pneumatic masses 47, 47 and air layers which surround the cylindrical pneumatic masses 45 between the pneumatic masses 47, 47 act as air springs 48 by connecting to the air chambers 88 via the through holes 89. Accordingly, two-degrees-of-freedom vibration systems 49 are formed at the peripheral portions of the continuous holes 86a.

Next, an operation of the sound isolation plate 81 according to the fourth embodiment of the present invention will be explained hereunder.

The single-degree-of-freedom vibration systems 46 and the two-degrees-of-freedom vibration systems 49 are composed in the continuous holes 86a respectively. The sound isolation effect is obtained due to transmitted wave interference generated by actions of these systems. Furthermore, the frequency characteristic of transmission loss of the sound isolation plate 81 is arbitrarily tuned by adjusting the number, size, shape, etc. of the through holes 89.

Figure 11:
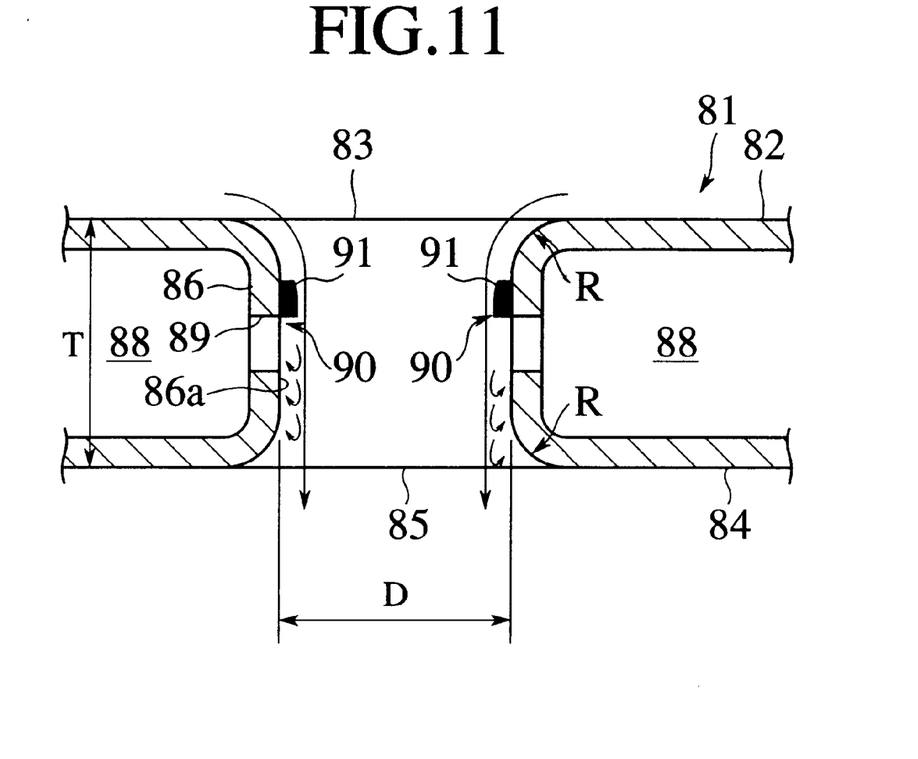
FIG. 11 is a sectional view showing a fragmental sectional shape of the sound isolation plate structure shown in FIG. 8.

As shown in FIG. 11, the air, which are passed through peripheral portions of the holes 83 formed in the perforated board 82 positioned toward the inlet side, flows in along the funnel-shaped curved surfaces of the peripheral portions of the holes 83 and is also passed through inner peripheral surfaces of the continuous holes 86a continuing to the funnel shapes, as indicated by the arrow 50.

Therefore, the air flows never separate from the inner peripheral surfaces of the continuous holes 86a, so that the air flows through with using full internal sectional areas of the continuous holes 86a effectively. As a result, the airflow resistance is remarkably reduced and the air permeability of the sound isolation plate 81 is further improved.

In addition, because of the air flows passing through the continuous holes 86a respectively, vortex flows are generated at the downstream side peripheral portions of the through holes 89 in the continuous holes 86a. If the generated vortex flows are forced to collide with the downstream side peripheral portions of the through holes 89 periodically, periodical air particle vibrations are caused in the through holes 89. Thus, the internal spaces 88 formed on the outside of the cylindrical connecting portions 86 are caused to be resonant with each other, so that it is likely to generate so-called whistling sounds.

On the contrary, in the fourth embodiment, the air flows in the continuous holes 86a are deviated to the center sides of the continuous holes 86a in terms of the stepped portions 90 respectively when they pass through in the neighboring of the through holes 89. For this reason, the vortex flows are generated to be deviated to the center sides of the continuous holes 86a respectively, so that they never collide with the peripheral portions of the through holes 86a on the downstream side. Therefore, periodical air particle vibrations are not generated in the through holes 86a and therefore generation of the whistling sound due to such periodical air particle vibrations is surely prevented.

Now, the air permeability of the sound isolation plates 1, 61, 71, 81 in the above embodiments will be considered hereunder.

Figure 13:
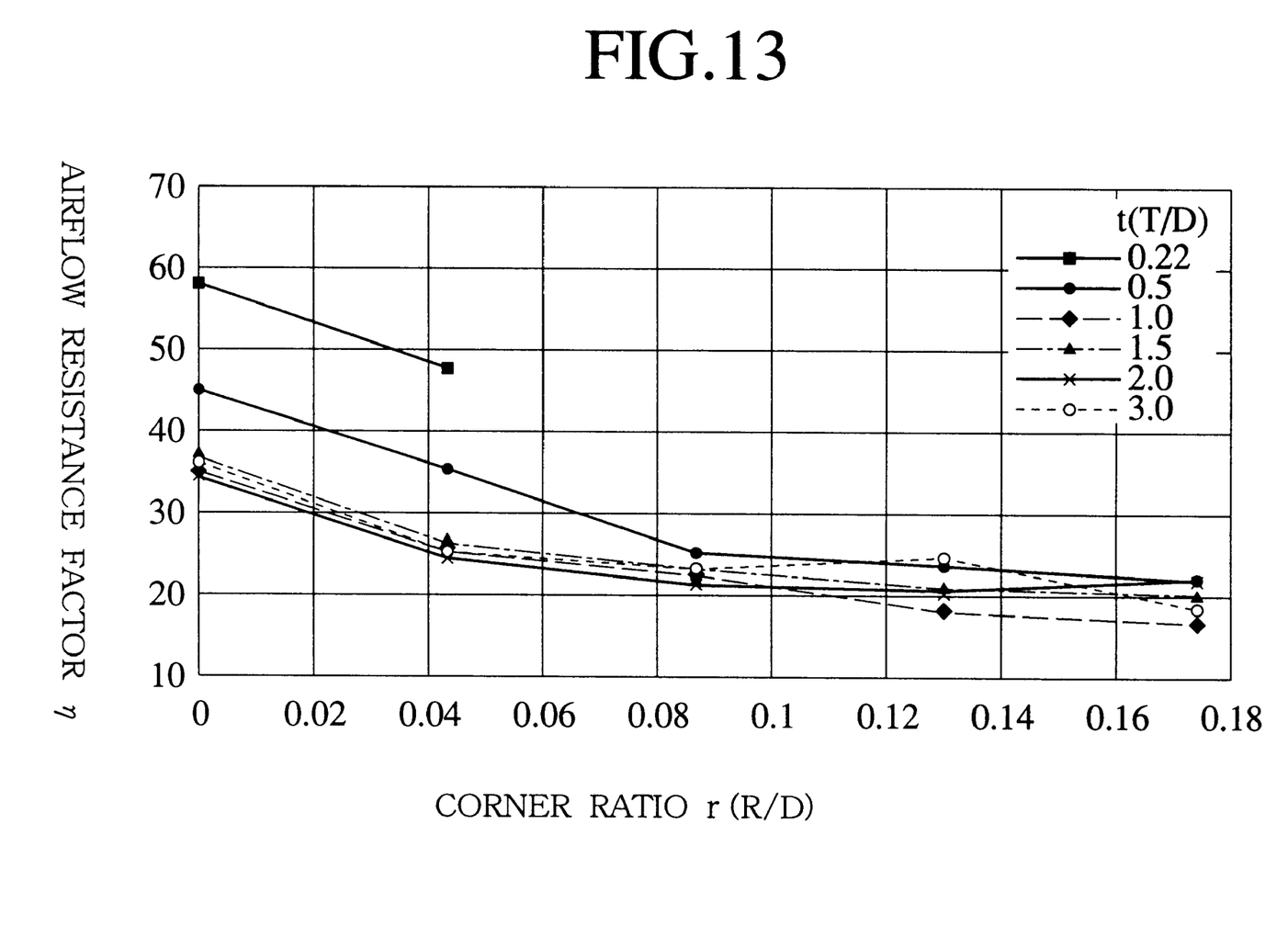
FIG. 13 is a characteristic view showing the experimental result of the air permeability examination.

A ratio R/D has been changed to 0.004, 0.09, 0.13, and 0.17 respectively. Where R is a radius of curvature of the curved surface at the peripheral portions of the holes 3a, 3b, 83 on the inlet side of air flow, and D is an inner diameter of the continuous holes 6a, 86a or the annularly extended portion 7. As a result, as shown in FIG. 13, change in an airflow resistance factor appears. It has been found that, if the ratio R/D is set in excess of 0.08, preferably 0.13, the airflow resistance factor is extremely reduced and thus the air permeability is improved.

Figure 14:
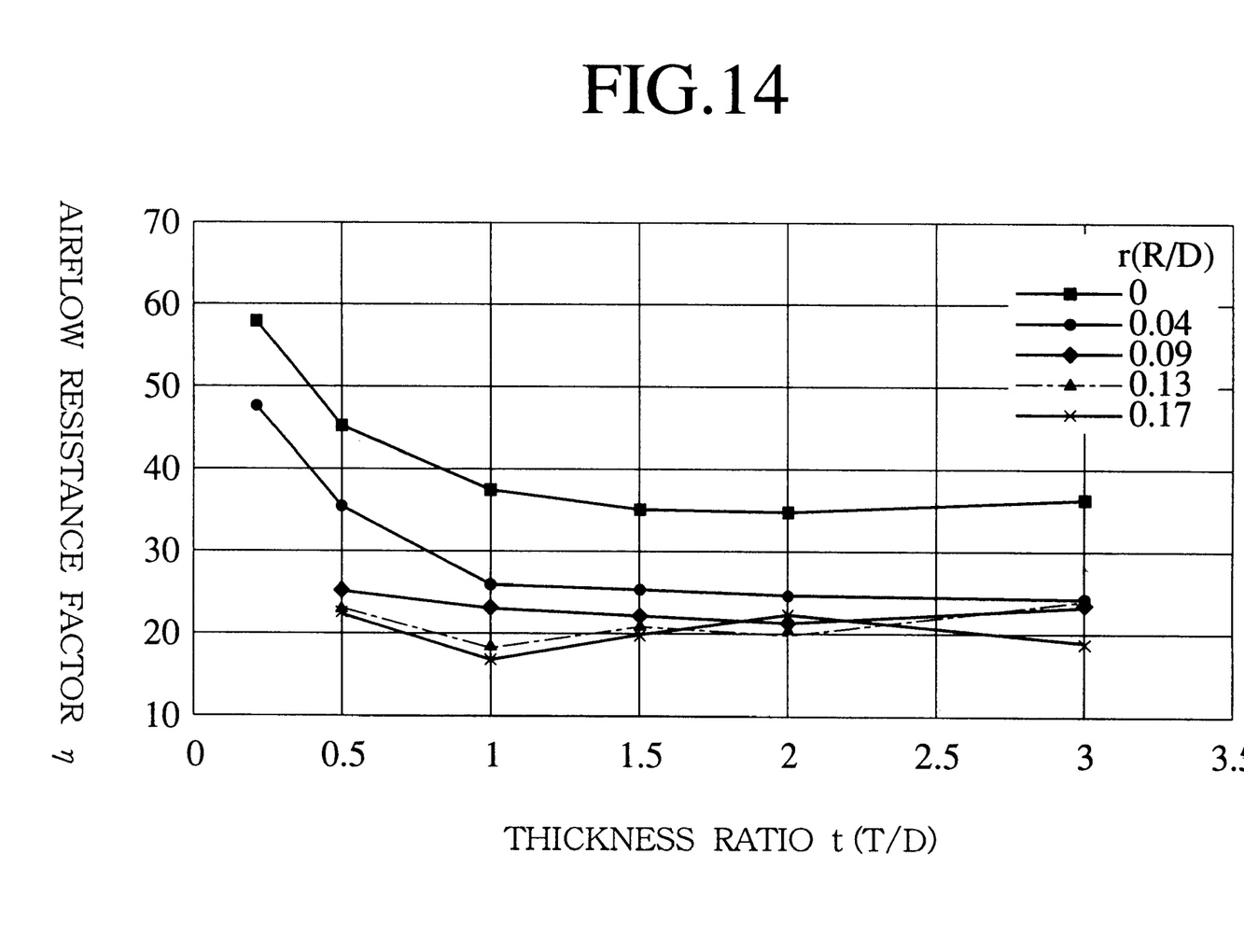
FIG. 14 is a characteristic view showing the experimental result of the air permeability examination.

In the similar way, a ratio T/D has been changed to 0.02, 0.5, 1.0, 1.5, 2.0, 3.0 respectively. Where T is a total thickness of the sound isolation plate 1, 61, 71, 81, and D is an inner diameter of the continuous holes 6a, 86a or the annularly extended portion 7. As a result, as shown in FIG. 14, change in the airflow resistance factor appears. It has been found that, if the ratio T/D is set in excess of 1, the airflow resistance factor is extremely reduced and thus the air permeability is improved.

Figure 15:
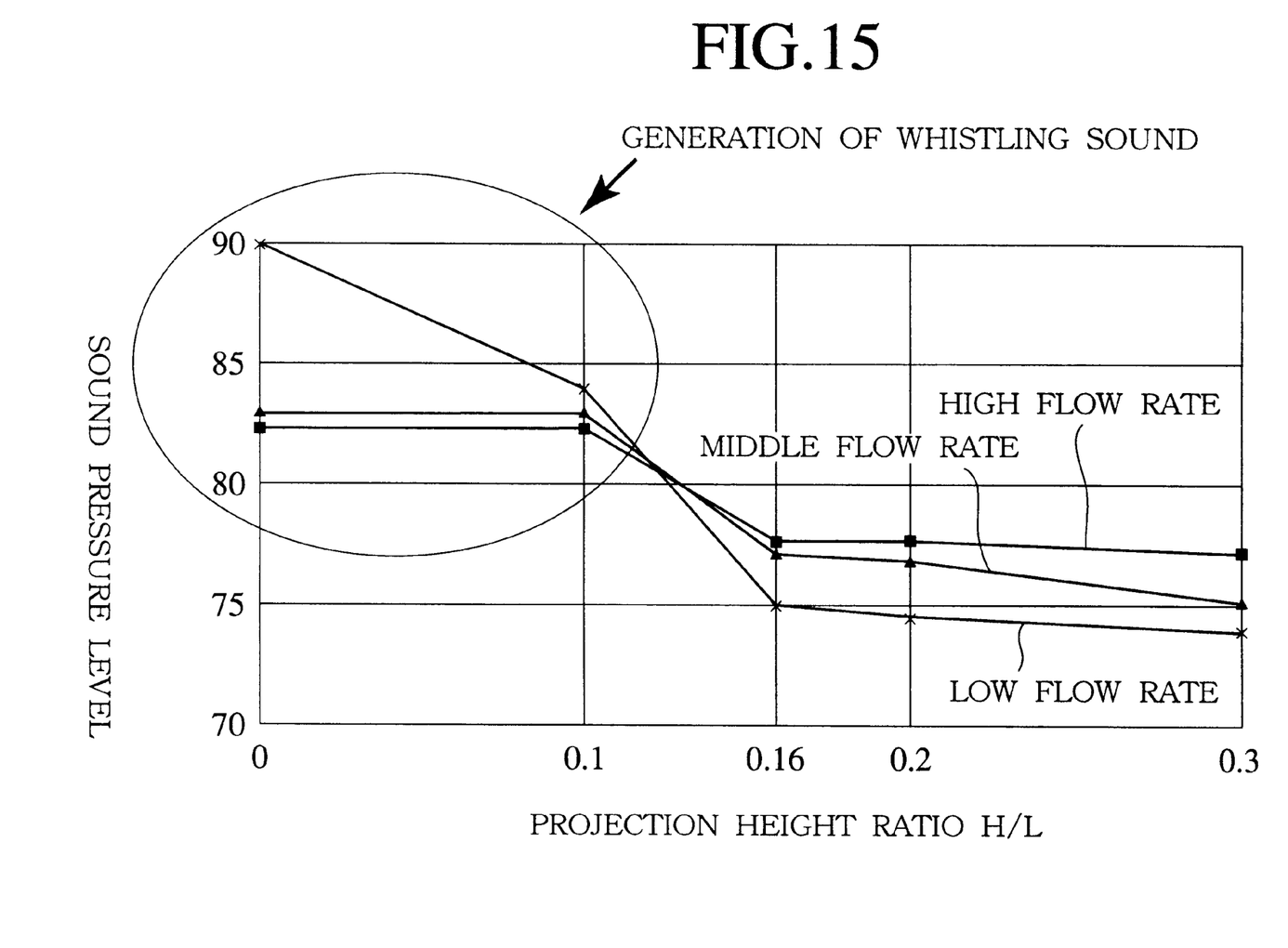
FIG. 15 is a characteristic view showing the experimental result of the whistling sound examination.
Figure 16:
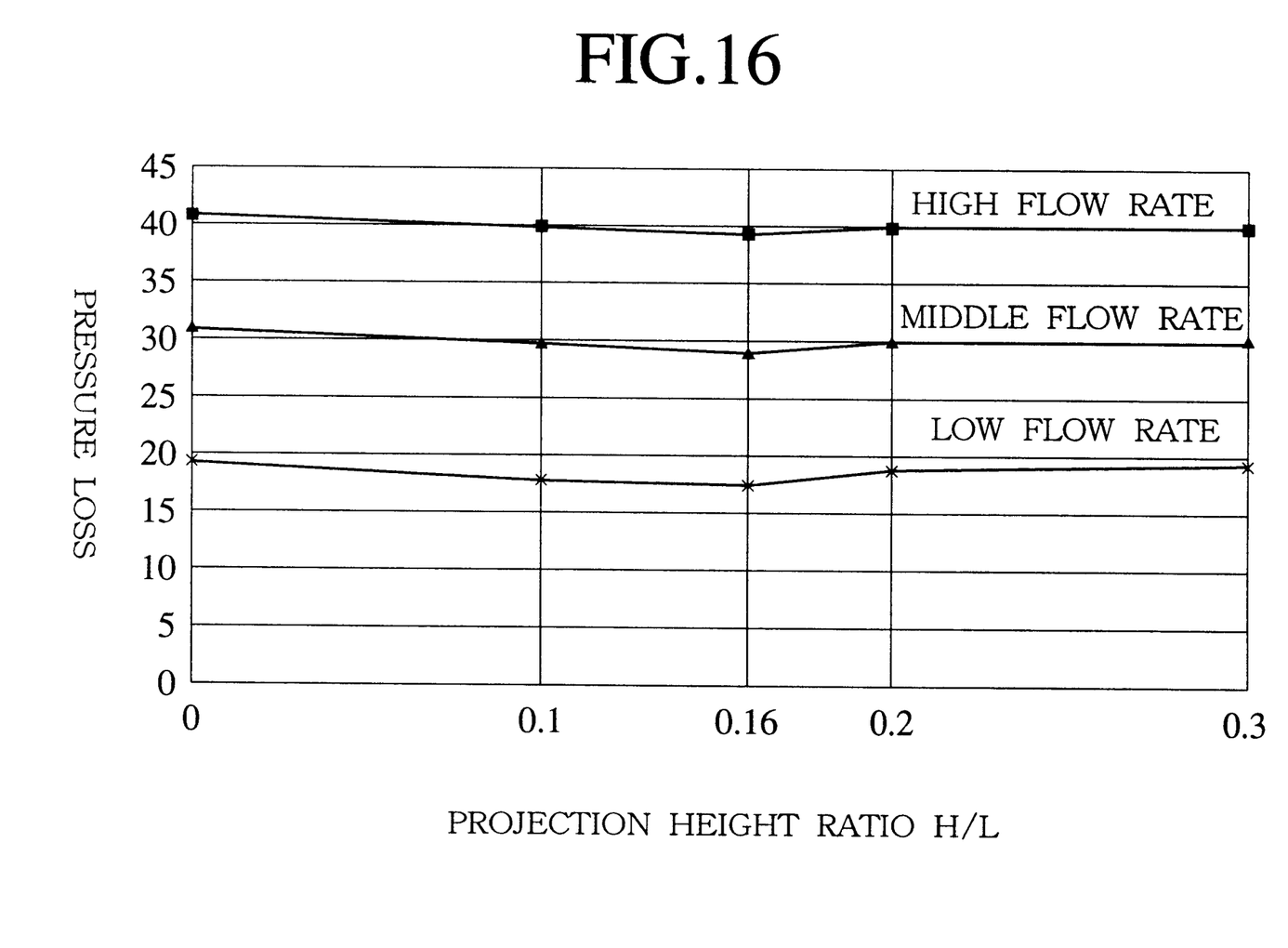
FIG. 16 is a characteristic view showing the experimental result of the air permeability examination.

Meanwhile, as for generation of the whistling sound, under the assumption that H is a height of the stepped portions 10, 90 including the projections 11, 63, 91, and L is a length between opposing extended portions 7, 7 or a length of the through holes 89 along the continuous holes, a ratio H/L has been changed to 0.01, 0.16, 0.2, 0.3 respectively. As a result, as shown in FIG. 15, change in a sound pressure level appear at high, middle, and low flow rates. It has been found that, if the ratio H/L is set to exceed 0.1, preferably 0.16, the sound pressure level is extremely reduced and, as shown in FIG. 16, change in pressure loss due to the stepped portions 10 is seldom caused and generation of the whistling sound is surely prevented without a reduction of the air permeability.

Accordingly, if the above specification values R, D, T, H, L of the sound isolation plates 1, 61, 71, 81 are set to satisfy R/D=0.13 or more, T/D=1 or more, and H/L=0.16 or more, the sound isolation plate which has the good air permeability without generation of the whistling sound and has the excellent sound isolation property is obtained.

Although not shown, if the holes 83, 85 in the fourth embodiment shown in FIGS. 8 to 12 are divided into the neighboring first and second holes, then the peripheral portions of the first holes are connected by the cylindrical connecting portions, and then, like the first embodiment shown in FIG. 2, opposing extended portions are provided to the peripheral portions of the second holes respectively, the two-degrees-of-freedom vibration systems may be provided in the second holes, and also the stepped portions may be formed on the top end inner peripheral surfaces of the extended portions on the upstream side of the air flow.

What is claimed is:

1. An airflow type sound isolation plate structure comprising:

a first plate member and a second plate member, the plate members positioned in parallel at a predetermined interval, the first plate member being arranged on an air inlet side, the second plate member being arranged on an air outlet side;

plural sets of first holes provided in the plate members respectively so as to oppose to each other;

plural sets of second holes provided adjacent to the plural sets of first holes in the plate members respectively so as to oppose to each other;

cylindrical connecting portions connecting peripheral areas of respective sets of the first holes such that continuous holes are formed therein;

annularly extended portions extended from peripheral areas of the plural sets of the second holes respectively so as to oppose to each other and not to contact to each other; and internal spaces provided around the annularly extended portions between both the plate members respectively; wherein inner peripheral surfaces of the first holes and the second holes formed in the first plate member are expanded gradually toward an upstream side of air flow, and all areas of top inner peripheral surfaces of the annularly extended portions formed in the first plate member are positioned on an inside rather than all areas of top inner peripheral surfaces of the annularly extended portions formed in the second plate member.

2. An airflow type sound isolation plate structure according to claim 1, wherein projections which protrude to the inside rather than the all areas of top inner peripheral surfaces of the annularly extended portions formed in the second plate member are provided to top ends of the annularly extended portions formed in the first plate member.

3. An airflow type sound isolation plate structure according to claim 1, wherein inner diameters of the annularly extended portions formed in the first plate member are set smaller than top end inner diameters of the annularly extended portions formed in the second plate member.

4. An airflow type sound isolation plate structure according to claim 1, wherein:

a ratio H/L is set to more than 0.1, where H is an offset length of top end inner peripheral surfaces of the annularly extended portions formed in the first plate member with respect to top end inner peripheral surfaces of the annularly extended portions formed in the second plate member, and L is an interval between the annularly extended portions formed in both the first plate member and the second plate member.

5. An airflow type sound isolation plate structure according to claim 2, wherein the projections are made low gradually toward the first plate member.

6. An airflow type sound isolation plate structure according to claim 1, wherein inner peripheral surfaces of the first holes and the second holes formed in the second plate member are expanded gradually toward a downstream of air flow.

7. A airflow type sound isolation plate structure comprising:

a first plate member and second plate member, the plate members positioned in parallel at a predetermined interval, the first plate member being arranged on an air inlet side, the second plate member being arranged on an air outlet side;

plural sets of holes provided in the plate members respectively so as to oppose to each other;

cylindrical connecting portions for connecting peripheral areas of respective sets of holes such that continuous holes are formed therein; and through holes formed in the cylindrical connecting portions so as to connect inner spaces and outer spaces of the continuous holes respectively; wherein:

inner peripheral surfaces of the holes formed in the first plate member are expanded gradually toward an upstream side of air flow, and peripheral portions of the through holes which are formed in the continuous holes and located on a first plate member side are positioned to protrude to an inside rather than those of the through holes which are formed in the continuous holes and located on a second plate member side.

8. An airflow type sound isolation plate structure according to claim 7, wherein the cylindrical connecting portions include a plurality of through holes each positioned at a substantially equal distance from the first plate member or the second plate member.

9. An airflow type sound isolation plate structure according to claim 7, wherein projections which protrude to an inside rather than inner surfaces of the cylindrical connecting portions are provided to peripheral portions of the through holes formed in the continuous holes on the first plate member side.

10. An airflow type sound isolation plate structure according to claim 7, wherein:

a ratio H/L is set to more than 0.1, where H is a projection height of each of the peripheral portions of the through holes on the first plate member side with respect to that of the peripheral portions of the through holes on the second plate member side, and L is a length of each of the through holes along the continuous holes.

11. An airflow type sound isolation plate structure according to claim 9, wherein the projections are made low gradually toward the first plate member.

12. An airflow type sound isolation plate structure according to claim 7, wherein inner peripheral surfaces of the holes formed in the second plate member are expanded gradually toward a downstream of air flow.

13. An airflow type sound isolation plate structure according to claim 1, wherein:

inner peripheral surfaces of the first holes formed in the first plate member are formed by curved surfaces with a radius of curvature R so as to expand gradually toward an upstream side of air flow, and a ratio R/D of the radius of curvature R to inner diameters D of the second holes is set to more than 0.08.

14. An airflow type sound isolation plate structure according to claim 1, wherein:

inner peripheral surfaces of the second holes formed in the first plate member are formed by curved surfaces with a radius of curvature R so as to expand gradually toward an upstream side of air flow, and a ratio R/D of the radius of curvature R to inner diameters D of the first holes is set to more than 0.08.

15. An airflow type sound isolation plate structure according to claim 6, wherein:

inner peripheral surfaces of the first holes formed in the second plate member are formed by curved surfaces with a radius of curvature R so as to expand gradually toward a downstream side of air flow, a ratio R/D of the radius of curvature R to inner diameters D of the second holes is set to more than 0.08, inner peripheral surfaces of the second holes formed in the second plate member are formed by curved surfaces with a radius of curvature R so as to expand gradually toward a downstream side of air flow, and a ratio R/D of the radius of curvature R to inner diameters D of the first holes is set to more than 0.08.

16. An airflow type sound isolation plate structure according to claim 7, wherein:

inner peripheral surfaces of the holes formed in the first plate member are formed by curved surfaces with a radius of curvature R so as to expand gradually toward an upstream side of air flow, and a ratio R/D of the radius of curvature R to inner diameters D of the holes is set to more than 0.08.

17. An airflow type sound isolation plate structure according to claim 12, wherein:

inner peripheral surfaces of the holes formed in the second plate member are formed by curved surfaces with a radius of curvature R so as to expand gradually toward a downstream side of air flow, and a ratio R/D of the radius of curvature R to inner diameters D of the holes is set to more than 0.08.

18. An airflow type sound isolation plate structure according to claim 1, wherein:

both a ratio T/D of a total thickness T of the sound isolation plate to inner diameters D of the first holes and a ratio T/D of the total thickness T of the sound isolation plate to inner diameters D of the second holes are set to more than 1.

19. An airflow type sound isolation plate structure according to claim 7, wherein:

a ratio T/D of a total thickness T of the sound isolation plate to inner diameters D of the holes is set to more than 1.

* * * * *